UNITED STATES PATENT OFFICE.

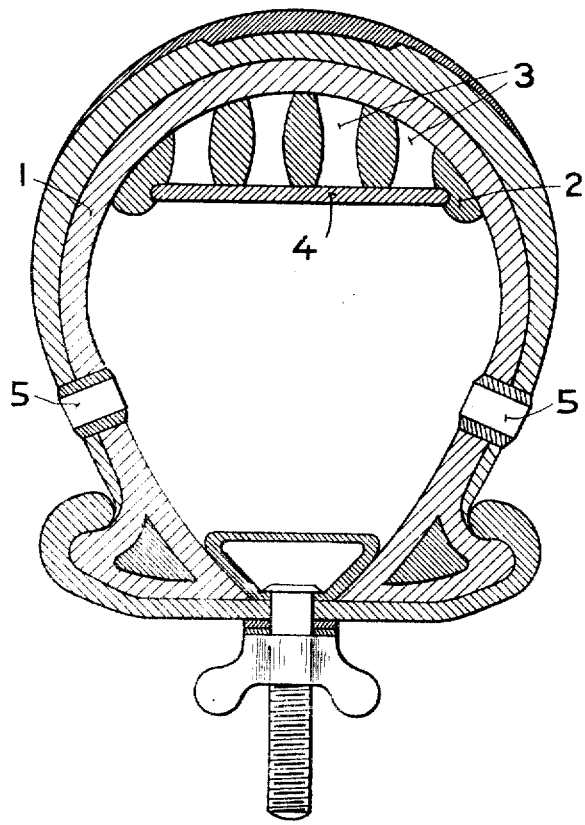

GUSTAV ADOLF ARNO BOERNER, OF AMSTERDAM, NETHERLAND.

RESILIENT TIRE FOR VEHICLE-WHEEL.

1,267,505.

Specification of Letters Patent.   Patented May 28, 1918.

Application filed August 8, 1916. Serial No. 113,821.

*To all whom it may concern:*

Be it known that I, GUSTAV ADOLF ARNO BOERNER, a subject of the Emperor of Germany, residing at No. 110 van Eeghenstraat, Amsterdam, The Netherlands, have invented certain new and useful Improvements in Resilient Tires for Vehicle-Wheels, of which the following is a specification.

This invention relates to resilient tires for automobiles and bicycles and its object is to provide a resilient tire possessing all advantages of the well known pneumatic tire, but in which all drawbacks connected therewith have been avoided.

Though in the last few years pneumatic tires have been improved considerably, it must be admitted that the part of the automobile which is most liable to be damaged and which is to be repaired far more often than other parts thereof is still represented by the pneumatic tire.

This fact is readily accounted for, when one takes into consideration that the inner or air tube which is filled with air compressed to a comparatively high pressure is protected by the outer cover only. If the latter comes in contact with a nail, a fragment of glass, a sharp stone or the like, then it is inavoidable that such an object will pierce through the outer cover and into the inner tube, causing the compressed air in the latter to escape violently. In many cases the inner tube will then burst over a larger or smaller area, whereby the outer cover may be damaged to such an extent that it cannot be used any longer and must be replaced by another one.

It has been proposed to avoid this drawback by reinforcing the tread of the outer cover by means of nails, metal plates and the like. It is, however, apparent that this reinforcement of the outer cover can only be applied within certain limits, as otherwise the resiliency of the tire would seriously be interfered with. This of course would more than compensate the advantage obtained by the tire being less liable to be punctured.

As such reinforcement may, therefore, never cover the entire tread of the tire, there is still a fair chance that a sharp object on the road will pierce the tire.

Apart from the outer cover and the inner tube becoming defective by sharp objects being pierced therein, it often happens that the inner tube will burst for some other reason.

An inner tube under a pressure of several atmospheres is loaded to the limit of its resistance and this limit is very liable to be exceeded, when the air in the inner tube expands by being heated by the heat of the sun, by heavily applying the brakes or for some other reasons.

Besides the damage caused by tire defects in case a tire does burst the danger exists that the automobiles will get out of the right direction, which may have fatal consequences for the persons in the automobile.

The main object of this invention therefore is to obtain a resilient tire, the elasticity of which is not dependent upon an air cushion very liable to become defective. According to the invention this object is attained by omitting the air or inner tube and replacing the same by a simple means readily to be mounted in the outer cover, which means will impart the same qualities to the outer cover as are connected with the pneumatic tire, however, without the drawbacks connected therewith.

In the accompanying drawing a resilient tire is illustrated by way of example, upon which tire the present invention has been applied, the tire being shown in cross section.

In the outer cover 1, which in the usual manner is made of rubber with canvas lining, a rubber ring 2 is provided. This rubber ring which closely fits into the inner periphery of the tire cover is provided with a plurality of radial openings 3, which provide the necessary space for the rubber to be displaced for obtaining the desired elasticity. The rubber ring preferably consists of one piece, and may have a thickness of e. g. 3/4 inch. The openings 3 may have a diameter of about 3/8 inch and may be spaced from one another at a distance of about 3/16 inch.

In the rubber ring a thin steel ring or band 4 is provided which has a thickness of e. g. 5/64 inch. In order to enable an easy mounting of the steel band 4 in the rubber ring 2, this steel band consists of four parts, which may in a suitable manner be connected together to form a unit.

In mounting the metal band 4 within the rubber ring 2, inside the cover 1 a suitable tensioning device of known construction may be used, enabling the segments of the said band to be firmly pressed against the inner face of the rubber ring 2. When the desired tension has thus been obtained, the four segments of the metal band 4 are connected together so as to form a ring of circular shape, whereupon the tensioning device is removed.

The formation of the openings 3 in the rubber ring 2 leaves a plurality of webs in the body of the latter, and these webs expand laterally into the openings under the pressure of the metal ring 4.

The disclosed means comprising a rubber ring and steel band acts, in just the same manner a the air tube hitherto employed, as it will eep the outer cover under a certain amount of pressure, which may be brought in correspondence to an air pressure of e. g. five to six atmospheres as customary in pneumatic tires.

As the tension of the steel band is entirely independent of the air pressure in the tire cover 1, the latter may be provided with air passages 5, whereby the air in the inner part of the tire cover will be enabled to circulate, in this manner avoiding a becoming warm of the tire when running.

The resilient tire arranged in the manner described hereinbefore is ready for use and may be put on the rim in the usual manner.

This resilient tire, which as far as elasticity is concerned is fully equal to the known pneumatic tire, is entirely immune to punctures caused by sharp objects piercing into the tires.

It is further an important advantage of the means according to this invention that it may be applied to all kinds of tire covers in use, so that the present invention opens the possibility to use again even the old outer covers which are no longer fit to be used in connection with air tubes and to wear same down to the canvas.

It will further be understood that the present invention is not limited to the special construction described hereinbefore and illustrated in the drawing, but that said construction may be varied within very wide limits without departing from this invention.

Though the example shown relates to an automobile tire, the invention may just as well be applied to tires for all kinds of motor driven vehicles and, with the necessary alterations, also to tires for bicycles.

Having thus described my invention, what I claim as new and desire to secure by Letters Patent is:—

A resilient tire for vehicle wheels, consisting of a flexible outer casing, a rubber resilient ring of segmental cross section fitting within said casing and having a plurality of openings extending from face to face, the said openings being spaced apart all over the width and circumference of the rubber ring, and a metallic expansion ring built up of a plurality of segments and arranged within the resilient ring and normally exerting and maintaining an outward pressure thereon, to thereby place the rubber webs between the openings under tension and expand the same laterally.

In testimony whereof I affix my signature in presence of two witnesses.

GUSTAV ADOLF ARNO BOERNER.

Witnesses:
D. KLEŸN,
L. V. N. BOOGAARD.